(12) United States Patent
Van Duyn

(10) Patent No.: US 6,212,974 B1
(45) Date of Patent: Apr. 10, 2001

(54) VARIABLE STIFFNESS POSITIONING LINK FOR A GEARBOX

(75) Inventor: Keven G. Van Duyn, Bloomfield, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/213,685

(22) Filed: Dec. 17, 1998

(51) Int. Cl.[7] .................................................. F16H 57/02
(52) U.S. Cl. .................................. 74/606 R; 267/64.13; 244/54
(58) Field of Search ............................ 74/606 R, 573 R, 74/574; 248/2, 548; 188/378, 379; 267/64.13, 64.15; 60/39.31; 244/54

(56) References Cited

U.S. PATENT DOCUMENTS

| | | | |
|---|---|---|---|
| 2,667,348 | * 1/1954 | Frye et al. ...................... 267/64.13 |
| 2,951,395 | 9/1960 | Smith et al. ........................ 74/606 |
| 3,568,806 | 3/1971 | Butt .................................... 188/1 |
| 4,301,989 | 11/1981 | Kallenbach ........................ 248/548 |
| 4,517,913 | 5/1985 | Albertini et al. .................. 114/293 |
| 5,031,396 | * 7/1991 | Margnelli ......................... 60/39.31 |
| 5,078,342 | 1/1992 | Langley et al. ..................... 244/54 |
| 5,176,339 | * 1/1993 | Schmidt ....................... 60/39.31 X |
| 5,275,357 | * 1/1994 | Seelen et al. .................. 60/39.31 X |
| 5,277,382 | 1/1994 | Seelen et al. ...................... 244/54 |
| 5,303,880 | 4/1994 | Cencula et al. .................... 244/54 |
| 5,435,124 | 7/1995 | Sadil et al. ....................... 60/39.31 |
| 5,524,847 | 6/1996 | Brodell et al. ..................... 244/54 |
| 5,529,276 | 6/1996 | Szablya ............................ 248/548 |
| 5,649,417 | 7/1997 | Hey ................................. 60/39.31 |
| 5,725,181 | 3/1998 | Hey .................................. 244/54 |
| 5,813,674 | 9/1998 | Dickie et al. .................... 277/395 |

OTHER PUBLICATIONS

Paper No. 952666 "Updating a 30–Year Old concept in Vibration Control" by Wallace C. Flower, Lord Corporation Date unknown, but prior to Dec. 17, 1997.

* cited by examiner

Primary Examiner—David A. Bucci
Assistant Examiner—Colby Hansen

(57) ABSTRACT

A gearbox mounting arrangement for a gas turbine engine includes a plurality of variable stiffness positioning links that attach the gearbox housing to the engine case. The links include a first portion that is connected to the engine case, a second portion connected to the gearbox and the first and second portion releasably connected by an isolation mechanism having a lower stiffness than the first and second portions. During a high rotor imbalance condition such as a fan blade loss condition, the links yield to a lower stiffness level than during normal operation as the isolation mechanism becomes operational in response to the application of high axial loads and the first and second portions partially disengage. The partial disengagement of the portions of the links of the present invention results in partially isolating the gearbox from the deflections experienced by the engine case. Thus, only a percentage of engine case imbalance loads are transmitted through the links to the gearbox. Alternate embodiments for the isolation mechanism are disclosed.

5 Claims, 3 Drawing Sheets

VARIABLE STIFFNESS POSITIONING LINK FOR A GEARBOX

TECHNICAL FIELD

The present invention relates to gas turbine engines, and more particularly to providing a variable stiffness mounting arrangement for a gearbox of the engine to minimize damage to the gearbox in the event of a high rotor imbalance condition such as a fan blade loss.

BACKGROUND ART

Modern gas turbine aircraft engines have gearboxes that are mounted on their external cases. The main gearbox is generally positioned under the engine's core or fan case and uses power from the engine to drive the major accessories needed for engine functions, such as generators for electricity, pumps for circulating fluids and heat exchangers for cooling oil or heating fuel. The accessories are frequently mounted on the gearbox.

The main gearbox of modern turbofan engines such as the Model PW4000, manufactured by the Pratt & Whitney Division of United Technologies Corporation, is mounted within the engine core cowl and is driven by an angle gearbox through a towershaft from the high-pressure compressor. Various components are mounted on the gearbox. The main gearbox drives the fuel pump, scavenge pump, the electrical generator for the electronic engine control, external deoiler, hydraulic pump, and the integrated drive generator (for producing electricity).

Various mounting arrangements are used to mount the gearbox to the external case. The gearbox is often connected to the engine case at two or more locations along the length of the gearbox. For example, a forward V-shaped link may be used to fasten the front of the gearbox to the engine. A plurality of side hanger links may be used on either side of the gearbox housing to support and stabilize the gearbox. Further, a mounting plate may also be used to provide alignment of the gearbox with respect to the engine case and prevent undesirable movement of the gearbox relative to the engine. Thus, the gearbox may be connected to the engine by a hard mount, that is, a connection which is essentially inflexible and immobile such that case deflections are transmitted to the gearbox. This hard mount arrangement imposes undesirable loads on the mounting hardware and on the gearbox itself.

One problem caused by such arrangements for mounting the gearbox to the engine case is subjecting the gearbox to high loads caused by rotor imbalances. Severe rotor imbalance can occur in an engine, particularly after a fan blade breaks off from the rotor assembly. One cause of fan blade loss is impact with foreign objects, such as birds, hailstones or other objects which, on occasion, are ingested into the engine. The detached fan blade is thrown outwardly and passes through the fan case, but is typically caught by the fabric wraps in the fan containment case assembly. Such blade loss produces an imbalance in the rotor and causes the rotor shaft to deflect radially outwardly. The more the rotor deflects, the greater is the radial load on the rotor bearing supports.

The rotor imbalance loads are transmitted from the bearing supports to the engine cases and ultimately to the gearbox fastened to the engine case. The gearbox is forced to move with the engine as the gearbox is fastened to the engine cases. Blade loss loads have been traditionally underestimated with respect to gearbox structural design. If the vibratory loads transmitted to the gearbox are high, the gearbox may not be able to sustain the imbalance loads and this may result in the failure of the gearbox housing itself, and often the liberation of the accessories themselves from the gearbox.

When the gearbox housing breaks, oil from within the gearbox may splash over the hot case of the engine and immediately ignite, causing a fire. The release of oil from within the gearbox also potentially damages the internal components of the gearbox as they would have to operate without lubrication. If an accessory breaks off from the box or pulls apart, spilled hydraulic fluid or fuel may cause a fire. If the generator pulls off, a very large component is liberated that can potentially break through the engine cowling itself and ultimately hit an aircraft control surface.

Consequently, gearbox housings have been made thicker, the mount points stronger, and other strength and durability requirements have been increased. However, these prior art solutions have resulted in substantially heavier hardware which in turn has resulted in the gearbox mount loads to increase. In turn, the efficiency of the engines is adversely impacted by such heavier hardware.

It is also known to use a mounting arrangement having some flexibility or mobility to absorb energy and thus prevent the gearbox from engine case deflections and distortions. However, the flexible mounting arrangements of the prior art adversely compromise the life of the hardware as the elastomeric materials used to introduce the desired flexibility harden when cycled in a high temperature environment.

Thus, the challenge for modern gas turbine engines, during fan blade loss events, is the limiting of damage to the gearbox mounts and the gearbox itself.

DISCLOSURE OF THE INVENTION

A primary object of the present invention is to provide a gearbox mounting arrangement that protects the gearbox from the undesirable effects of engine case deflections and distortions experienced during high rotor imbalance events such as a fan blade loss condition.

According to the present invention, a variable stiffness positioning link for a gearbox for a gas turbine engine includes a first portion connected to the engine case, a second portion connected to the gearbox and an isolation mechanism having a lower stiffness than the first and second portions and which releasably connects the first and second portion, wherein during a high rotor imbalance event such as a fan blade loss condition, the isolation mechanism becomes operational in response to the application of high axial loads and causes the first and second portions to partially disengage. The partial disengagement of the portion of the variable stiffness link results in partially isolating the gearbox from the deflections experienced by the engine case, thus partially isolating the gearbox from the bulk of the energy of the engine case. Even though the variable stiffness link still transmits some load from the engine case to the gearbox in the partially disengaged state, the lower stiffness of the link reduces the transmission of loads to the gearbox, thus minimizing damage to the gearbox due to high deflection loads.

In one embodiment of the present invention, the energy associated with the loads transmitted through the variable stiffness positioning links is dissipated via damping of a fluid which is disposed in the isolation mechanism.

In another embodiment of the present invention, the energy associated with the loads transmitted through the variable stiffness positioning links is accommodated by the compression of an elastomer disposed in the isolation mechanism.

A primary advantage of the present invention is the minimization of damage to the gearbox housing and accessories during large rotor imbalance conditions such as in the event of a fan blade loss. The variable stiffness positioning links of the present invention provide acceptable means of controlling the displacement of the gearbox. A further advantage of the gearbox links of the present invention is their ability to provide an appropriate positioning structure for the gearbox during normal operating conditions. Another advantage is the ease and cost of manufacturing and incorporating into the gearbox of the prior art the variable stiffness positioning links of the present invention. The simplicity of the structure of the gearbox links and the use of economic materials, allows for cost effective manufacturing processes. Further, gearboxes of the prior art can be retrofitted to include the present invention in a cost-effective manner. The gearbox housing can be made lighter as the strength of the gearbox housing does not have to be increased due to the present invention. As a result, the use of the variable stiffness positioning links of the present invention is beneficial to the efficiency of the engine.

The foregoing and other objects, features and advantages of the present invention will become more apparent in the following detailed description of the best mode for carrying out the invention and from the accompanying drawings which illustrate an embodiment of the invention.

BEST MODE FOR CARRYING OUT THE INVENTION

Figure 1:
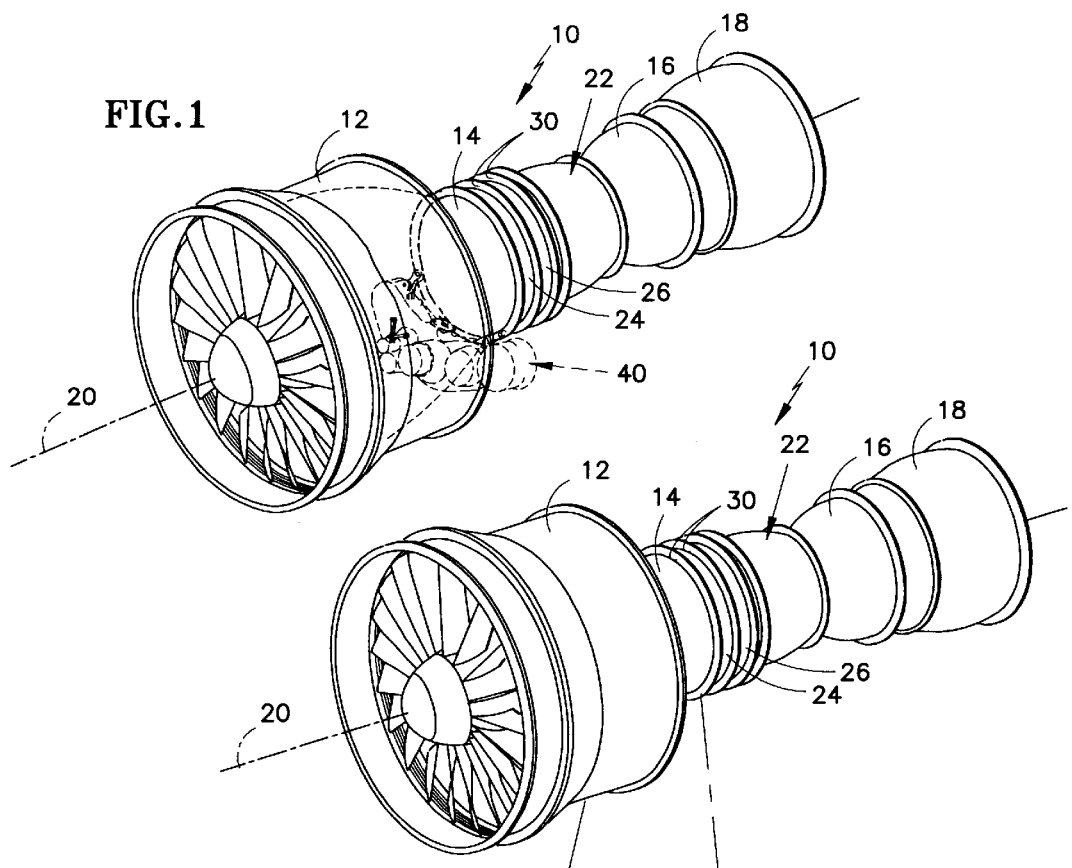
FIG. 1 is a perspective view of a typical axial flow, turbofan engine showing a gearbox mounted to the engine's external case

Referring to FIG. 1, a gas turbine engine 10 includes as its principal components a fan section 12, a compression section 14, a combustion section 16 and a turbine section 18. The compression and turbine sections each contain one or more stages of a compressor and turbine (not shown) which rotate about a central rotational axis 20. The principal components are circumscribed by an essentially cylindrical external case 22, which serves as a main structural support for the engine. The external case is usually constructed of individual case sections, such as case sections 24 and 26, which are joined together at bolted flanges such as flange 30. A gearbox 40 is mounted to the external case section 22.

Figure 2:
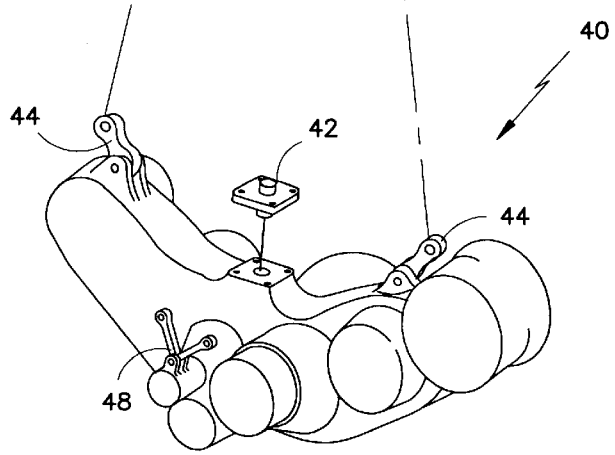
FIG. 2 is a perspective view of the gas turbine engine of FIG. 1 with an enlarged, exploded view of the gearbox.
Figure 3:
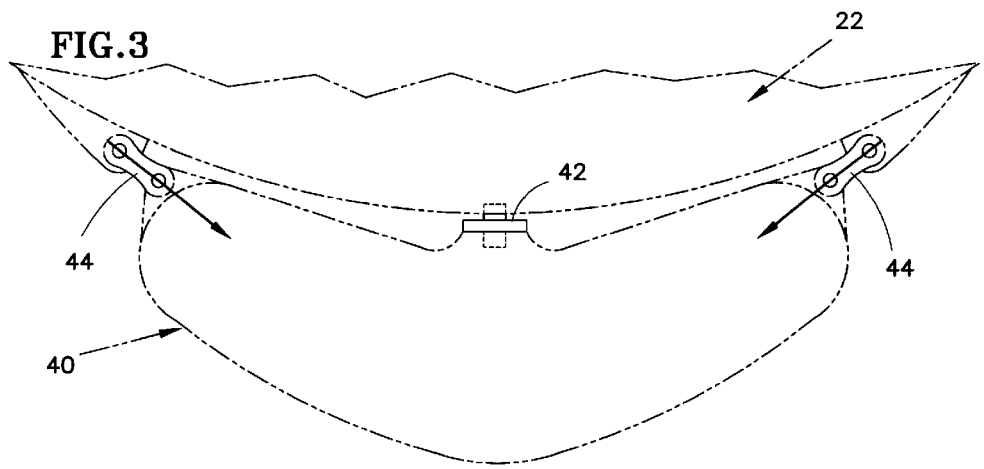
FIG. 3 is a view showing the mounting arrangement of the gearbox housing assembly of the prior art.

Referring to FIGS. 2 and 3, the gearbox 40 is mounted to the external case by locator 42 and side links 44. The locator 42 fastens the gearbox housing to the engine case to provide alignment of the gearbox relative to the engine. The side links of the prior art for the gearbox provide for an attachment of the gearbox to the engine case. The gearbox is also attached to the engine by the V-shaped link 48 axially forward of the locator 42 and side links 44. These mounting arrangements may be hard mounts, which connect the gearbox 40 to the engine case by essentially inflexible, immobile connections that transmit case deflections and distortions to the gearbox. During a blade loss event, loads transmitted throughout the engine can be extremely high. It is often very difficult to maintain structural integrity of the gearbox whose case and housing are often made of lightweight, but low strength materials such as aluminum. In the prior art, the problem of sustaining high loads was solved by strengthening the accessory housing which significantly increases the engine weight or by using flexible mounting arrangements which would have a limited life due to the exposure of the flexible materials to a high temperature environment.

Figure 4:
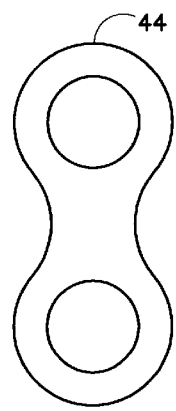
FIG. 4 is a front view showing a hanger link of the prior art.
Figure 5:
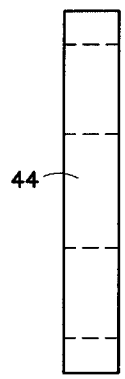
FIG. 5 is a side view showing the hanger link of FIG. 4.

Referring to FIGS. 4 and 5, the hanger links 44 of the prior art only transmit axial (with respect to the link) loads from the engine case 22 to the gearbox 40. As the links of the prior art provide a hard path to the gearbox, axial loads from engine case deflections are transmitted through the links to the gearbox. During a high rotor imbalance condition, such as a fan blade loss event, the axial loads transmitted from the engine case through the links to the gearbox may exceed the gearbox strength. This would compromise the integrity of the gearbox housing and accessories mounted on the gearbox.

Figure 6:
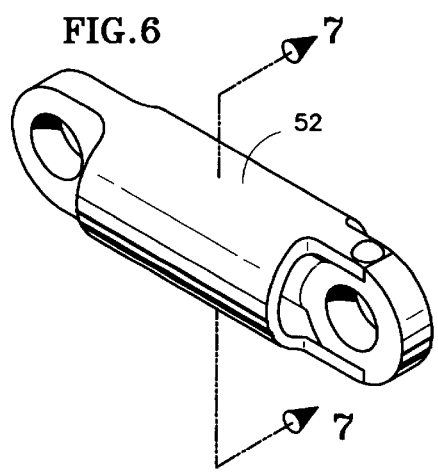
FIG. 6 is a perspective view showing a cylindrical embodiment of the variable stiffness positioning link of the present invention.
Figure 7:
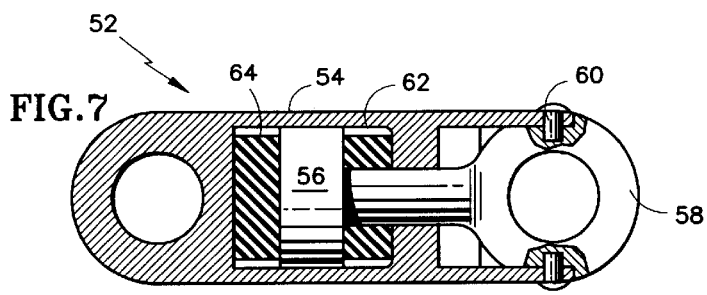
FIG. 7 is a cross-sectional schematic view taken in the direction of line 7—7 of FIG. 6 showing an embodiment of the variable stiffness positioning link, including an elastomeric damper, of the present invention.
Figure 10:
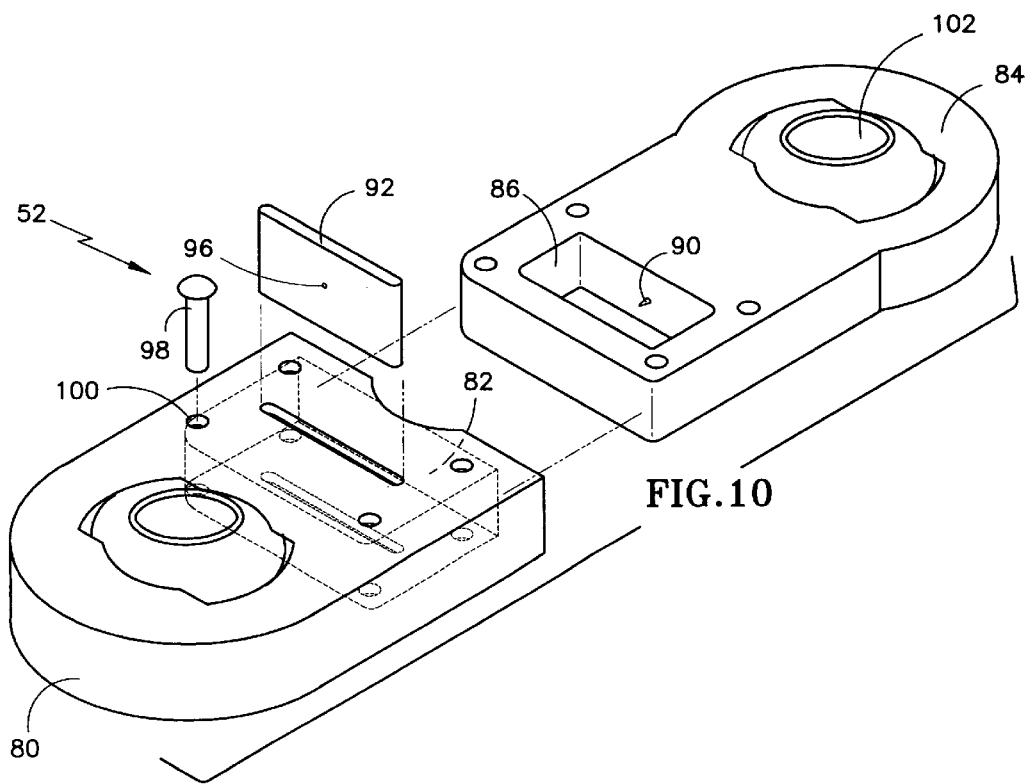
FIG. 10 is an exploded view of the rectangular embodiment of the present invention shown in FIG. 9.

Referring to FIG. 6, the variable stiffness positioning links 52 of the present invention may be cylindrical or rectangular in cross-section (shown with respect to FIGS. 10 and 11). As seen more clearly in a preferred embodiment shown in FIG. 7, the variable stiffness positioning link 52 of the present invention, includes a cylinder 54, a piston 56 slidably disposed within the cylinder and a connecting rod 58, which can preferably be formed integrally with the piston. The connecting rod 58 is connected to the cylinder 54 at one end thereof by shear pins 60, which are sized for sustaining a predetermined level of axial load. A chamber 62 is formed in the cylinder which is filled with an elastomer 64. During a fan blade loss condition, high axial loads (either compressive or tensile) are transmitted from the engine case 22 to the gearbox 40 through the links 52 of the present invention. When the load levels exceed the predetermined load level for the shear pins 60, the pins shear, thus allowing the piston 56 to travel in the chamber 62 under such loading. The piston compresses the elastomer 64 which provides a reduced spring rate load path for the transmission of axial loads to the gearbox. Thus, upon shearing the pins, the piston moves in the chamber filled with the elastomer and there is a partial disengagement of the cylinder and the piston. The partial disengagement of the cylinder and the piston results in partially isolating the gearbox from the deflections of the engine case. As a result, the bulk of the energy from the deflections of the engine case is not transmitted to the gearbox. The variable stiffness links still transmit a percentage of the loads from the engine case to the gearbox. However, the movement of the piston in the chamber and the resultant compression of the elastomer in the chamber provides for a link having a lower stiffness level as compared to the links of the prior art, thus partially isolating the gearbox from engine case deflections and associated loads.

Figure 8:
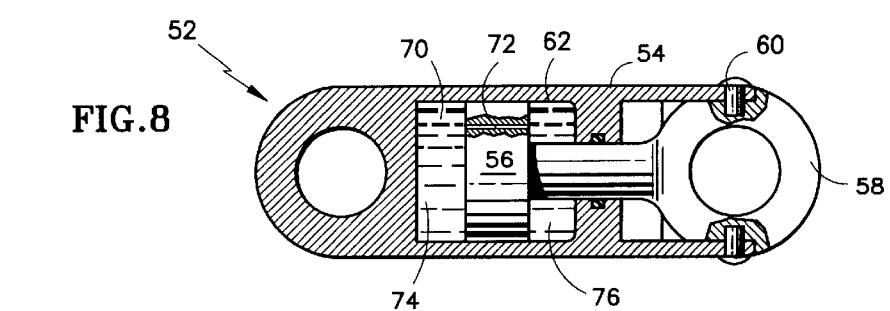
FIG. 8 is a cross-sectional schematic view similar to FIG. 7 showing another embodiment of the variable stiffness positioning link, including a fluid damper, of the present invention.

Referring to FIG. 8, another preferred embodiment of the variable stiffness positioning links 52 of the present invention includes damping fluid in the chamber 62 formed in the cylinder. The damping fluid 70 is normally a hydraulic fluid suitable for the temperature environment of the gearbox. A hole 72 in the piston 56 is sized to allow for the flow of the fluid 70 between the two reservoir portions 74, 76 of the chamber 62 partitioned by the piston 56 as the piston moves therein. Much like the operation of the embodiment described hereinabove, when the load levels exceed the predetermined load level of the shear pins 60, the pins shear allowing the piston 56 to travel in the chamber 62. The movement of the piston is dampened by the fluid 70 disposed in the chamber. The partial disengagement of the cylinder from the piston, due to the shearing of the pins, results in partially isolating the gearbox from the deflections of the engine case. As a result, the bulk of the energy from the deflections of the engine case is not transmitted to the gearbox. The variable stiffness links of the present invention still transmit a smaller percentage of the loads from the engine case to the gearbox. However, the movement of the piston 56 in the fluid filled chamber 62 provides a link having a lower stiffness level than prior art and dissipates the energy transmitted therethrough.

Figure 9:
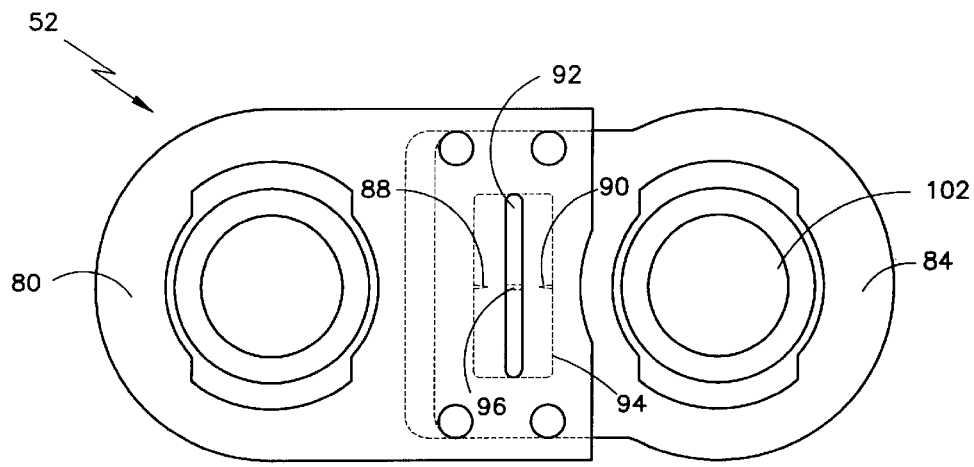
FIG. 9 is a cross-sectional view of a rectangular embodiment of the variable stiffness positioning link of the present invention.

Referring to FIGS. 9 and 10, another embodiment of the present invention 52 includes a first member 80 having a slot 82 disposed therein. A second member 84 has a chamber 86 disposed therein. The first 80 and second 84 members interfit with each other so that the slot 82 and the chamber 86 are generally aligned. The chamber has two pins 88, 90 positioned at the axial ends thereof. A piston 92 is received within the slot so it effectively divides the chamber into two equal portions. Both portions of the chamber are filled with a fluid 94 such as the damping fluid noted above. There is a hole 96 in the piston, sized to allow for the passage of fluid 94 through the piston. Shear pins 98 fit into corresponding holes 100 through the two members 80, 84. When an axial load, such as a tensile load, is applied to the links 52 that exceeds the capability of the shear pins, the pins 98 will shear and allow the first member 80 to move relative to the second member 84. The fluid 94 in the chamber 86 will be forced to move through the hole 96 in the piston 92 from one portion of the chamber to the other. The pins 88 or 90 gradually stop the flow of the fluid through the hole in the piston and thereby prevents an abrupt termination of the movement of the fluid in the chamber. The fluid in the chamber provides damping of the portion of loads transmitted to the gearbox. The embodiment of the present invention shown in FIGS. 9 and 10 provides the details of the construction of the links and as such, details such as the spherical bearings 102 are shown. The spherical bearings eliminate the transmission of loads in all directions other than the axial direction.

As described heretofore, during a high rotor imbalance even such as a fan blade loss condition, excessive deflection loads are transmitted to the engine case and in turn to the gearbox. In turn, the variable stiffness positioning links of the present invention partially disengage and result in the partial isolation of the gearbox from the deflections of the engine case. The bulk of the energy associated with the deflections of the engine case is not transmitted to the gearbox. The links of the present invention only transmit a percentage of the loads from the engine case to the gearbox.

In the partially disengaged state, the links have a lower stiffness level as compared to the links of the prior art. Thus, when a predetermined load level of the links, which is typically within a range of fifty to seventy-five percent of the maximum load applied to the gearbox which would result in breakage of the gearbox, is reached, the axial spring rate of the links is reduced to a second lower stiffness level at which the external gearbox can still be attached to the engine case without being compromised. The links thus have a load level at which the link transitions from a high spring rate to a second lower spring rate when a high rotor imbalance condition occurs.

A primary advantage of the present invention gearbox link is a minimization of damage to the gearbox in the event of large rotor deflections and imbalance, such as a fan blade loss. A further advantage of the present invention is its ability to provide an appropriate restraining structure to the gearbox during both normal operation and a high rotor imbalance. Another advantage is the ease and cost of manufacturing and incorporating the variable stiffness links of the present invention. The simplicity of the structure and the use of economical materials allows for cost effective manufacturing processes. Further, current, prior art gearboxes can be retrofitted to include the gearbox links in a cost-effective manner. The present invention fits into the envelope of prior art gearboxes. By incorporating the present invention, engines limit damage to the gearbox housing during high rotor imbalance events.

The links of the present invention may be implemented in a variety of ways. The links have been described as having a piston held by fasteners that shear when subjected to certain load levels. The movement of the piston is dampened by the presence of either an elastomer or a fluid that fills the chamber between the two opposed ends of the links. These embodiments are purely exemplary. Other configurations of links may be utilized in light of the teachings herein that use different damping material. Further, a rectangular and cylindrical embodiment of the links is disclosed. It should be understood that other shapes that fit the available envelope may be used.

Although the invention has been shown and described with respect to detailed embodiments thereof, it should be understood by those skilled in the art that various changes in form and detail thereof may be made without departing from the spirit and the scope of the claimed invention.

What is claimed is:

1. A variable stiffness positioning link for securing a gearbox to a gas turbine engine case, said link characterized by having a first spring rate in a first direction during normal operation, said link comprising:

a first link portion having one end adapted to be connected to a gas turbine engine case;

a second link portion having one end adapted to be connected to a gearbox; and release means connecting said first and second link portions to prevent relative movement between said link portions in said first direction during normal operation and adapted to release and allow relative movement between said link portions in said first direction upon said link being subjected to an abnormally high load in said first direction, said link portions being constructed and arranged to define an isolation mechanism wherein upon release of said release means said link portions reconnect through said isolation mechanism, said isolation mechanism having a spring rate in said first direction lower than said first spring rate to decrease loads transmitted between said link portions in said first direction upon the release of said release means.

2. The variable stiffness positioning link according to claim 1, wherein said isolation mechanism comprises a) a compartment formed within said link, b) an elastomer disposed within said compartment, and c) a piston secured to one of said link portions and disposed within said compartment in contact with said elastomer, wherein upon release of said release means said link portions are adapted to move relative to each other and transmit loads between each other in said first direction at said lower spring rate through compression of said elastomer by said piston.

3. The variable stiffness positioning link according to claim 2, wherein said compartment is a cylindrical compartment within one of said link portions and has an axis extending in said first direction, and said piston is cylindrical and is secured to said other one of said link portions.

4. The variable stiffness positioning link according to claim 3, wherein said release means includes a shear pin that shears under abnormally high loads in said first direction.

5. The variable stiffness positioning link according to claim 2, wherein said release means includes a shear pin that shears under abnormally high loads in said first direction.

* * * * *